(12) United States Patent
Clarke et al.

(10) Patent No.: US 8,776,326 B2
(45) Date of Patent: Jul. 15, 2014

(54) PANEL CONNECTION SNAP ASSEMBLY

(75) Inventors: Martin D. H. Clarke, Aurora (CA);
Zach M. Dresser, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 305 days.

(21) Appl. No.: 13/509,662

(22) PCT Filed: Nov. 30, 2010

(86) PCT No.: PCT/US2010/058261
§ 371 (c)(1),
(2), (4) Date: May 14, 2012

(87) PCT Pub. No.: WO2011/068769
PCT Pub. Date: Jun. 9, 2011

(65) Prior Publication Data
US 2012/0284975 A1    Nov. 15, 2012

Related U.S. Application Data

(60) Provisional application No. 61/265,419, filed on Dec. 1, 2009.

(51) Int. Cl.
*F16B 21/18* (2006.01)
*B60R 13/02* (2006.01)

(52) U.S. Cl.
CPC ........... *B60R 13/0206* (2013.01); *F16B 21/186* (2013.01)
USPC ............................................. 24/297; 411/508

(58) Field of Classification Search
USPC ................. 24/297, 453, 682.1, 683; 411/508; 292/DIG. 11; 403/326
See application file for complete search history.

(56) References Cited

U.S. PATENT DOCUMENTS

| | | | | |
|---|---|---|---|---|
| 2,526,790 A | * | 10/1950 | Wroblewski | 403/326 |
| 3,551,963 A | * | 1/1971 | Mosher, Jr. | 24/618 |
| 3,724,150 A | * | 4/1973 | Hudnall | 174/486 |
| 3,843,078 A | * | 10/1974 | Schon et al. | 244/135 B |
| 3,896,698 A | * | 7/1975 | Aylott | 411/548 |
| 3,916,756 A | * | 11/1975 | Yoda | 24/682.1 |

(Continued)

FOREIGN PATENT DOCUMENTS

| | | | |
|---|---|---|---|
| DE | 102004048436 A1 | 4/2006 | |
| GB | 2082668 A * | 3/1982 | F16B 21/00 |

(Continued)

OTHER PUBLICATIONS

International Search Report and Written Opinion for PCT/US2010/058261 mailed Mar. 2, 2011.

*Primary Examiner* — Jack W Lavinder
(74) *Attorney, Agent, or Firm* — Mark W. Croll; Paul F. Donovan

(57) ABSTRACT

A connection assembly incorporating a striker of elongated configuration including a base platform and an elongated pin segment projecting away from one side of the base platform. A housing holding the striker includes a plurality of internal snap arms normally extending in inwardly angled relation. The elongated pin segment extends along an axial passageway such that the distal ball head and at least a portion of the striker shaft project outwardly away from the housing with the internal snap arms behind the base platform. A striker catch engages the distal ball head upon insertion into the striker catch.

20 Claims, 5 Drawing Sheets

(56) References Cited

U.S. PATENT DOCUMENTS

| | | | |
|---|---|---|---|
| 4,318,208 A * | 3/1982 | Borja et al. | 24/305 |
| 4,408,372 A * | 10/1983 | Kimura et al. | 24/662 |
| 4,505,611 A * | 3/1985 | Nagashima et al. | 403/21 |
| 4,506,419 A * | 3/1985 | Mitomi | 24/297 |
| 4,616,953 A * | 10/1986 | Gomes | 403/292 |
| 4,782,562 A * | 11/1988 | Yuta | 24/297 |
| 4,874,276 A * | 10/1989 | Iguchi | 411/48 |
| 5,014,934 A * | 5/1991 | McClaflin | 244/132 |
| 5,168,604 A * | 12/1992 | Boville | 24/297 |
| 5,647,713 A * | 7/1997 | Ge et al. | 411/509 |
| 5,651,634 A * | 7/1997 | Kraus | 403/408.1 |
| 6,264,393 B1 * | 7/2001 | Kraus | 403/282 |
| 6,336,768 B1 * | 1/2002 | Kraus | 403/408.1 |
| 6,594,870 B1 * | 7/2003 | Lambrecht et al. | 24/297 |
| 7,017,239 B2 * | 3/2006 | Kurily et al. | 24/297 |
| 7,073,230 B2 * | 7/2006 | Boville | 24/297 |
| 7,152,281 B2 * | 12/2006 | Scroggie | 24/297 |
| 7,257,867 B2 * | 8/2007 | Mizukoshi et al. | 24/297 |
| 7,413,367 B2 * | 8/2008 | Hawang | 403/297 |
| 7,452,154 B2 * | 11/2008 | Aoshima et al. | 403/122 |
| 7,549,199 B2 * | 6/2009 | Bugner | 24/297 |
| 7,735,235 B2 * | 6/2010 | Waddell et al. | 33/664 |
| 7,838,787 B2 * | 11/2010 | Balsells et al. | 200/519 |
| 7,858,892 B2 * | 12/2010 | Balsells et al. | 200/519 |
| 8,322,001 B2 * | 12/2012 | Ehrhardt et al. | 24/289 |
| 8,584,325 B2 * | 11/2013 | Onuma | 24/297 |
| 8,677,573 B2 * | 3/2014 | Lee | 24/297 |
| 2004/0083583 A1 * | 5/2004 | Bradley et al. | 24/297 |
| 2006/0228166 A1 * | 10/2006 | Balsells | 403/57 |
| 2007/0107174 A1 * | 5/2007 | Bordas | 24/664 |
| 2008/0044255 A1 * | 2/2008 | Rosemann | 411/508 |
| 2009/0094800 A1 | 4/2009 | Reznar | |
| 2011/0258820 A1 * | 10/2011 | Komsitsky et al. | 24/453 |
| 2012/0110793 A1 * | 5/2012 | Watanabe et al. | 24/289 |
| 2013/0014353 A1 * | 1/2013 | Loewe et al. | 24/292 |

FOREIGN PATENT DOCUMENTS

| | | | | |
|---|---|---|---|---|
| WO | WO 2004067975 A2 * | 8/2004 | | F16C 11/04 |
| WO | WO 2004067975 A3 * | 10/2004 | | F16C 11/04 |
| WO | 2009032193 A1 | 3/2009 | | |

* cited by examiner

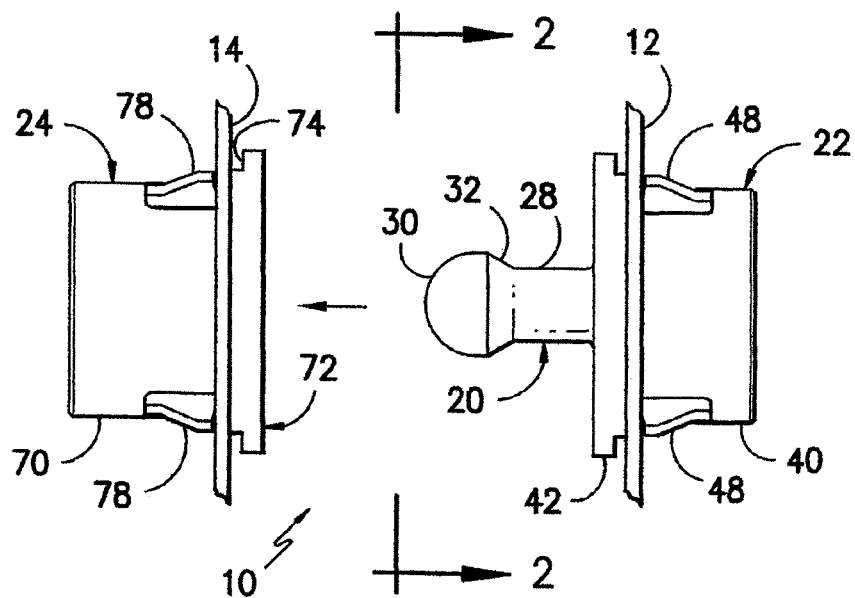
FIG. -1-
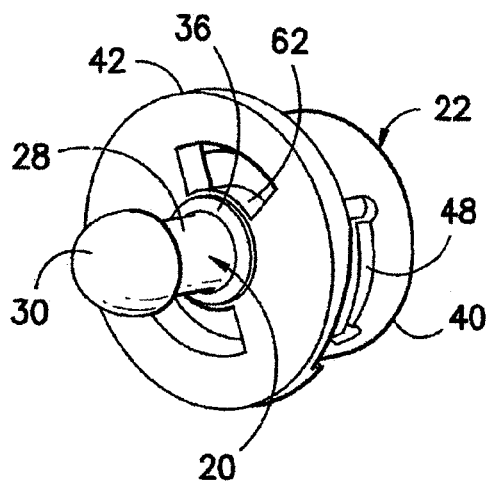
FIG. -2-

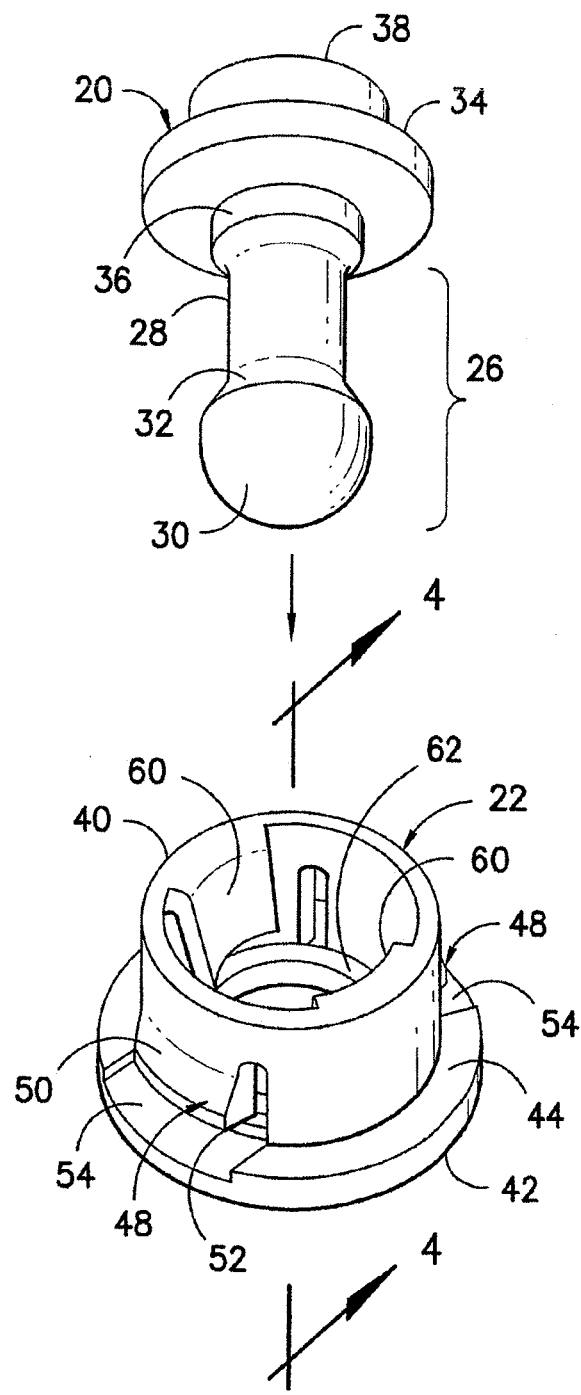
FIG. -3-

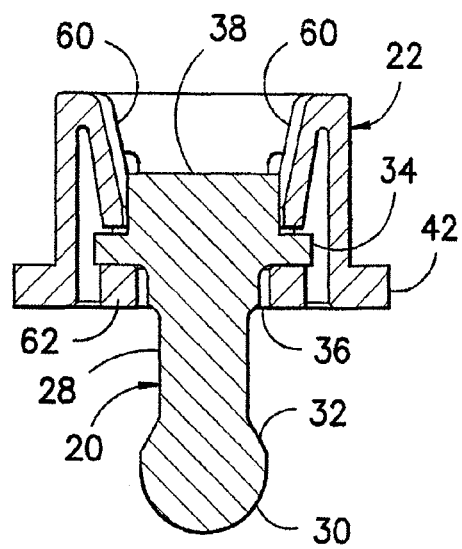
FIG. -4-
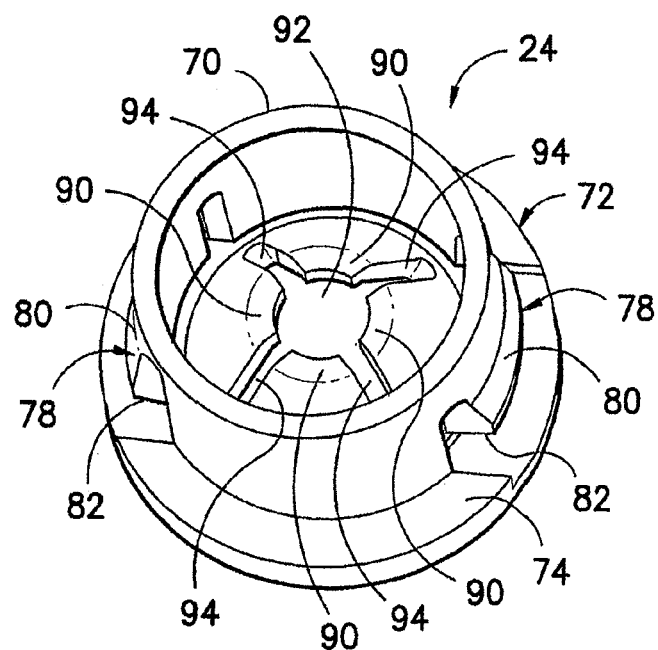
FIG. -5-

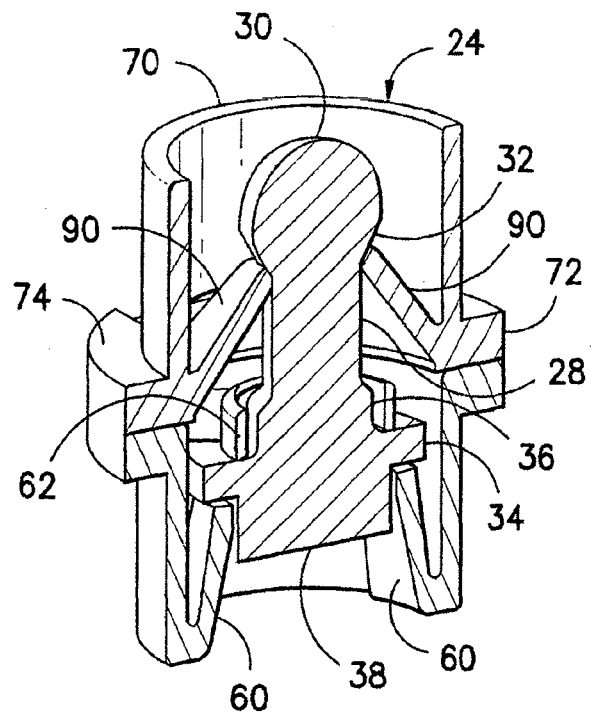
FIG. -6-
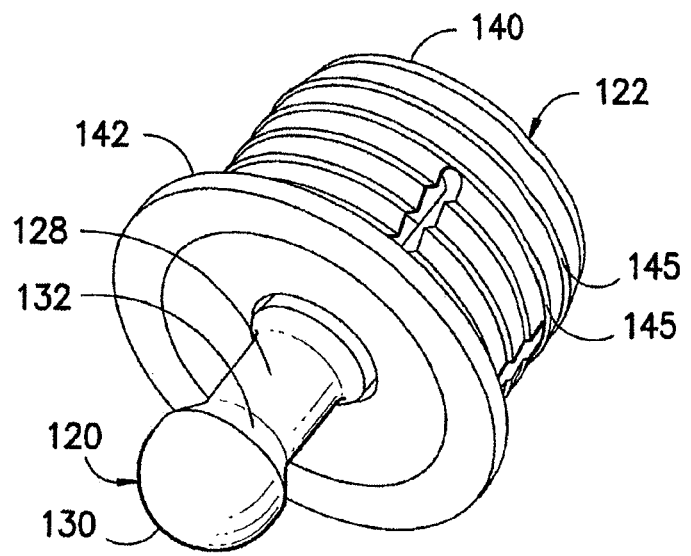
FIG. -7-

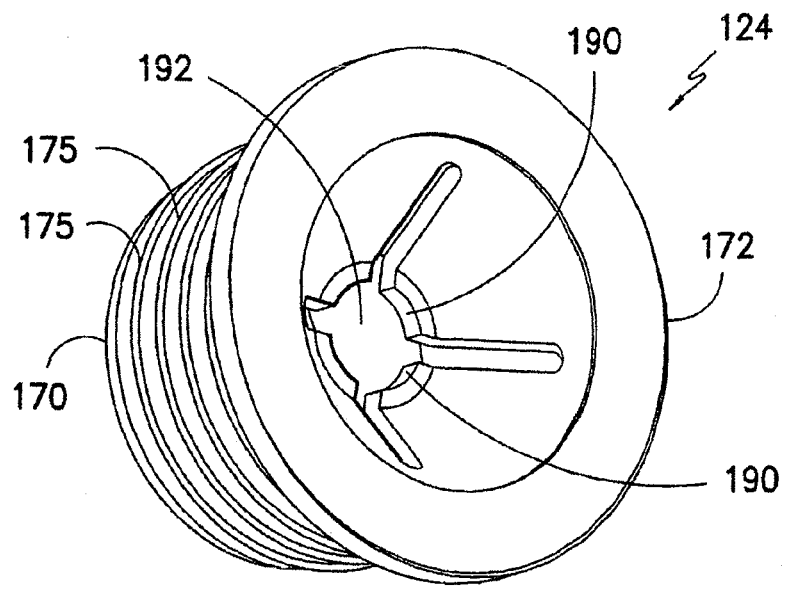
FIG. -8-
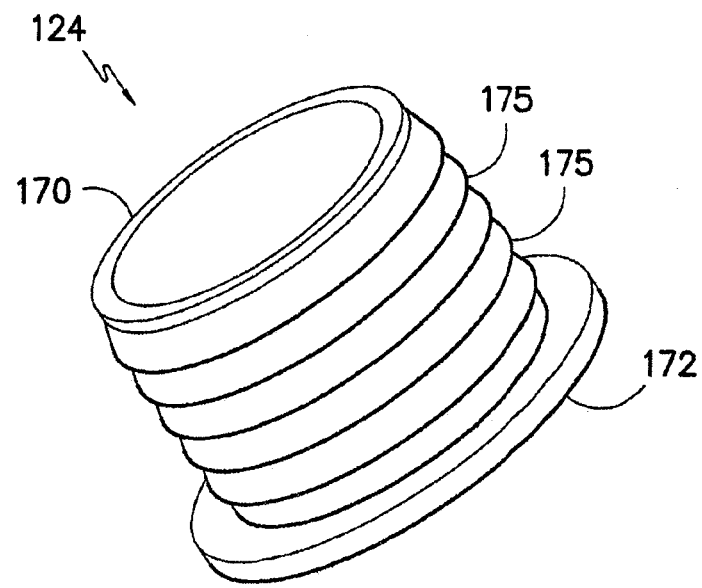
FIG. -9-

US 8,776,326 B2

PANEL CONNECTION SNAP ASSEMBLY

CROSS-REFERENCE TO RELATED APPLICATION

This non-provisional application claims the benefit of, and priority from, U.S. Provisional Application 61/265,419 filed on Dec. 1, 2009 the contents of which are incorporated herein by reference in their entirety.

TECHNICAL FIELD

The present invention relates generally to snap-together connection assemblies and, more particularly, to a connection assembly adapted to join a panel to another panel, to a frame or to another support structure. The connection assembly may be particularly useful for joining together appliance panels, securing automotive trim panels in place relative to a base plate, securing a wood structure in place or similar environments of use.

BACKGROUND OF THE INVENTION

In many environments of use it may be desirable to join a covering panel or other structure to an underlying support such as a panel, frame or other support structure by a snap-in engagement between the covering panel and the underlying support. By way of example only, one exemplary situation where such snap-in engagement may be desirable is in the attachment of surface panels in appliances. Another exemplary situation where such snap-in engagement may be desirable is securing cover elements in place across a wood or wood-like structure. As will be appreciated, an attachment assembly used for such connections must be sufficiently secure to avoid rattling or displacement due to vibration. At the same time, the attachment assembly should facilitate proper placement of the panel relative to the underlying support.

One connection assembly which has been used in the past incorporates a mounting base with an opening adapted to receive a ball head striker such that the head of the striker projects outwardly from the mounting base. The mounting base with the striker in place is then attached to the panel face using screws or other attachment devices such that the striker projects away from the panel face. A corresponding female catch is mounted at the opposing support structure. Upon insertion of the striker head into the female catch, a connection is established, thereby holding the panel to the support structure.

While the prior attachment assembly as described provides a good connection, it nonetheless requires a relatively complex assembly procedure in which the striker is held loosely within the mounting base as the mounting base is screwed down to the underlying support. Moreover, since the mounting base and the striker are independent from one another, one or the other may become lost prior to making the connection. Further, in the prior assembly once the mounting base is screwed to the underlying support, the striker is held in a fixed position with limited ability to move laterally within the mounting base. Thus, precise alignment with the female catch is required.

SUMMARY OF THE INVENTION

The present invention offers advantages and alternatives over the prior art by providing a connection assembly incorporating a striker housing adapted to be held in an opening in a first panel or other structure. An enhanced diameter base of a ball-headed striker is secured at the interior of the striker housing by snap arms with the head of the striker projecting outwardly away from the panel or other structure. A catch is adapted to be secured in an opposing panel or other structure. The catch grasps and retains the striker head in engaged relation upon insertion of the striker head. The engaged relation may be reversed by pulling the striker away from the catch. A substantially coaxial hub may project downwardly from the enhanced diameter base in a direction extending away from the striker shaft if desired. The striker may be pre-assembled with the striker housing if desired. The striker may move laterally to some degree within the striker housing in a floating manner to facilitate alignment with the opposing catch.

In accordance with one exemplary aspect, the present invention provides a snap assembly adapted to adjoin a first element in juxtaposed opposing relation to a second element. The snap assembly includes a striker of elongated configuration including a base platform and an elongated pin segment projecting away from one side of the base platform. The elongated pin segment includes a striker shaft and a distal ball head. The snap assembly also includes a housing holding the striker. The housing has a perimeter wall structure including a plurality of external snap arms or a plurality of surface ring segments defining a plurality of circumferential ledges along the length of the housing adapted to hold the housing within an opening in the first element. The housing further includes a plurality of internal snap arms normally extending in inwardly angled relation from the wall structure towards a reduced diameter axial passageway at the interior of the housing. The reduced diameter axial passageway has an effective diameter which is greater than the distal ball head and less than the base platform. The elongated pin segment extends along the reduced diameter axial passageway such that the distal ball head and at least a portion of the striker shaft project outwardly away from the housing with the base platform of the striker held between the reduced diameter axial passageway and distal ends of the internal snap arms. The snap assembly also includes a striker catch adapted to lockingly engage the distal ball head upon insertion into the striker catch.

In accordance with another exemplary aspect, the present invention provides a snap assembly adapted to adjoin a first element in juxtaposed opposing relation to a second element. The assembly includes a striker of elongated configuration including a base platform and an elongated pin segment projecting away from one side of the base platform. The elongated pin segment includes a striker shaft disposed between the base platform and a distal ball head with an outwardly flared chamfered surface at the intersection between the striker shaft and the distal ball head. A housing is adapted to receive and to hold the striker. The housing includes a housing barrel segment of annular configuration extending away from a housing collar of enhanced diameter relative to the housing barrel segment. The housing barrel segment has a perimeter wall structure including a plurality of external snap arms or a plurality of ring segments defining a plurality of circumferential ledges along the length of the housing adapted to hold the housing within an opening in the first element. The housing barrel segment further includes a plurality of internal snap arms disposed at the interior of the housing barrel segment. The internal snap arms normally extend in inwardly angled relation from the wall structure towards a ring structure defining a reduced diameter axial passageway at the interior of housing with the distal ends of the internal snap arms being spaced axially from the ring structure. The reduced diameter axial passageway has an effective diameter which is greater than the distal ball head and less than the base platform. The internal snap arms are oriented such that the base platform urges the internal snap arms radially outwardly during insertion of the striker into the housing barrel segment during insertion along an axial travel path extending from the housing barrel segment towards the plane defined by the housing collar such that the internal snap arms snap behind the base platform upon insertion of the striker to hold the base platform between the internal snap arms and the ring structure with the distal ball head and at least a portion of the striker shaft projecting outwardly away from the plane defined by the housing collar. A striker catch lockingly engages the distal ball head upon insertion into the striker catch.

In accordance with another exemplary aspect, the present invention provides a snap assembly adapted to adjoin a first element in juxtaposed opposing relation to a second element. The snap assembly includes a one-piece molded striker of elongated configuration including a base platform and an elongated pin segment projecting away from one side of the base platform. The pin segment includes a striker shaft extending between the base platform and a distal ball head with an outwardly flared chamfered surface at the intersection between the striker shaft and the distal ball head. The distal ball head has an effective diameter which is less than the effective diameter of the base platform and greater than the effective diameter of the shaft. The striker further includes a proximal hub projecting from the side of the base platform facing away from the pin segment. The proximal hub is substantially aligned along a common axis with the pin segment. A housing of one-piece molded construction holds the striker. The housing includes a housing barrel segment of annular configuration extending away from a housing collar of enhanced diameter relative to the housing barrel segment. The housing barrel segment has a perimeter wall structure including a plurality of external snap arms, wherein the external snap arms include free edges disposed in opposing raised relation to the housing collar such that the external snap arms and the housing collar cooperatively clamp a portion of the first element and hold the housing in snap-fit relation within an opening in the first element. The housing barrel segment further includes a plurality of internal snap arms disposed at the interior of the housing barrel segment. The internal snap arms normally extend in inwardly angled relation from the perimeter wall structure towards a ring structure defining a reduced diameter axial passageway at the interior of the housing with the distal ends of the internal snap arms being spaced axially from the ring structure. The reduced diameter axial passageway has an effective diameter which is greater than the distal ball head and less than the base platform. The internal snap arms are oriented such that the base platform urges the internal snap arms radially outwardly during insertion of the striker into the housing barrel segment along an axial travel path such that the internal snap arms snap behind the base platform upon insertion of the striker to hold the base platform between the internal snap arms and the ring structure with the distal ball head and at least a portion of the striker shaft projecting outwardly away from the plane defined by the housing collar. A striker catch of one-piece molded construction is adapted to lockingly engage the distal ball head upon insertion into the striker catch. The striker catch includes a catch barrel segment of annular configuration extending away from a catch collar of enhanced diameter relative to the catch barrel segment. The catch housing barrel segment has a perimeter wall structure including a plurality of external snap arms adapted to hold the striker catch in snap-fit relation within an opening in the second element. The striker catch further includes a plurality of flexible interior retaining arms extending in angled relation away from the plane defined by the catch collar. The distal ends of the retaining arms form the perimeter of an acceptance opening adapted to receive the distal ball head. The acceptance opening has a normal diameter less than the distal ball head such that the retaining arms flex outwardly upon insertion of the distal ball head into the acceptance opening and the distal ends of the retaining arms are held against the chamfered surface.

BRIEF DESCRIPTION OF THE DRAWINGS

FIG. 1 is an assembly view illustrating an exemplary connection assembly in accordance with one embodiment of the present invention with the striker and catch secured in snap-fit relation within opposing panel structures;

FIG. 2 is a schematic perspective view taken generally along line 2-2 in FIG. 1 illustrating features of the exemplary connection assembly;

FIG. 3 is a partial assembly view illustrating an exemplary sub-assembly of a ball-headed striker aligned for insertion within a striker housing in accordance with one embodiment of the present invention;

FIG. 4 is a sectional view taken generally along line 4-4 in FIG. 3 illustrating snap-fit retention of the ball-headed striker within a complementary striker housing;

FIG. 5 is a schematic perspective view of an exemplary striker catch adapted to be held in snap-in relation to a panel in accordance with one embodiment of the present invention;

FIG. 6 is a sectional view illustrating the striker and catch of FIG. 1 in engaged relation;

FIG. 7 illustrates an exemplary sub-assembly of a ball-headed striker within a striker housing in accordance with another embodiment of the present invention;

FIG. 8 is a schematic perspective view illustrating the interior of an exemplary striker catch in accordance with another embodiment of the present invention; and FIG. 9 is a schematic perspective view illustrating the exterior of the exemplary striker catch of FIG. 8.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to the drawings, a snap assembly 10 is illustrated in FIG. 1. The snap assembly 10 is adapted to connect a first panel element 12 such as a surface trim element or the like to an opposing second panel element 14 such as a frame, underlying support panel, or the like such that the panel elements 12, 14 are held together in a substantially face to face juxtaposed relation. By way of example only, and not limitation, the first panel element 12 may be an appliance trim panel or the like and the second panel element 14 may be a backing support plate. Of course, the snap assembly 10 may likewise be used in other environments including automotive assembly, building construction and the like. In this regard, the panel elements 12, 14 are not limited to any particular configuration and may be formed from a variety of materials including metals, polymers, wood and the like. Thus, while the panel elements 12, 14 are illustrated as simple planes, they may have a wide range of complex geometries.

As best seen through joint reference to FIGS. 1-3 and 5, the exemplary snap assembly 10 includes a striker 20 of elongated geometry secured at the interior of a housing 22 having a substantially annular configuration. In the assembled condition illustrated in FIGS. 1 and 2, the striker 20 is substantially coaxial with the housing 22 with the distal end of the striker projecting outwardly away from the housing 22. By way of example only, and not limitation, the striker 20 may be formed as a one piece structure from a relatively hard polymeric material such as acetal resin, ABS or the like using injection molding or other suitable practices as will be known to those of skill in the art. The housing 22 also may be formed as a one piece structure from a resilient polymeric material such as a toughened polyamide or the like using injection molding or other suitable practices as will be known to those of skill in the art. By way of example only toughened Nylon 6 or Nylon 6-6 may be desirable for some applications although other polymeric materials including polyesters, polypropylene and the like may be used if desired.

As shown, the snap assembly 10 also includes a striker catch 24 of generally annular construction adapted to receive and retain the distal end of the striker 20. The striker catch 24 may be formed as a one piece structure from a resilient polymeric material such as a toughened polyamide or the like using injection molding or other suitable practices as will be known to those of skill in the art. By way of example only toughened Nylon 6 or Nylon 6-6 may be desirable for some applications although other polymeric materials including polyesters, polypropylene and the like may be used if desired.

Referring now to FIG. 3, it may be seen that in the illustrated exemplary embodiment the striker 20 includes an elongated pin segment 26 including a shaft 28 extending to a distal ball head 30. As shown, the shaft 28 may be substantially cylindrical, although polygonal geometries may be used if desired. Likewise, the ball head 30 may be of generally hemispherical configuration although other non-spherical geometries may be used if desired. In the illustrated exemplary configuration, an outwardly flared chamfered surface 32 extends in angled relation away from the shaft 28 towards the ball head 30. In this regard, the chamfered surface 32 may have a substantially constant slope in the length direction to define a fixed angle without significant curvature in the length direction. Such an angled chamfered surface facilitates locking engagement with the striker catch 24 during operation as will be described further hereinafter.

As shown, in the exemplary embodiment the pin segment 26 projects outwardly away from an enhanced diameter platform 34 which has a diameter greater than the effective diameter of the ball head 30. In the exemplary construction, an intermediate step 36 is disposed between the enhanced diameter platform 34 and the shaft 28. The intermediate step 36 has a diameter which is less than the platform 34 but slightly greater than the effective diameter of the shaft 28. In this regard, the diameter of the intermediate step may approximate the effective diameter of the ball head 30. As will be appreciated, the intermediate step 36 provides an enhanced level of strength against breakage at the intersection between the enhanced diameter platform 34 and the shaft 28. While the intermediate step 36 is illustrated as having a generally circular ring-like configuration, virtually any geometry may be used as desired. However, it may be beneficial for the perimeter geometry of the intermediate step 36 to generally match the perimeter geometry of the shaft 28 to facilitate force distribution. In the illustrated exemplary arrangement, a proximal hub 38 extends from the side of the enhanced diameter platform that faces away from the pin segment 26. As will be described further hereinafter, the proximal hub 38 aids in centering the striker 20 within the housing 22.

As best seen through joint reference to FIGS. 1, 3 and 4, the housing 22 which supports the striker 20 is configured to be held in sunken, snap-fit relation within an opening in the first panel element 12. Specifically, in the exemplary illustrated construction, the housing 22 includes a generally annular barrel segment 40 extending away from one side of an enhanced diameter collar 42 to define a shoulder 44 at the intersection between the barrel segment 40 and the enhanced diameter collar 42. As seen in FIG. 1, the barrel segment 40 and the enhanced diameter collar 42 are sized to permit press-fit insertion of the barrel segment 40 through the acceptance opening (not shown) in the first panel element 12 while blocking passage of the enhanced diameter collar 42.

As best seen in FIG. 3, the barrel segment 40 of the striker housing 22 includes a pair of flexible external snap arms designated generally as 48 that snap behind the first panel element 12 to hold the housing 22 in place. Specifically, the external snap arms 48 are outwardly angled flap structures formed integrally within the wall of the annular barrel segment 40. In the illustrated construction, the external snap arms 48 include radially raised cam surfaces 50 extending to a position slightly outboard from the perimeter of the barrel segment 40. A free edge 52 is disposed below the can surfaces 50. As shown, the shoulder 44 includes molded-in depressions 54 in opposing relation to the free edges 52 to aid in facilitating pivoting action by the external snap arms 48 when a compressing force is applied.

As will be appreciated, when the barrel segment 40 is inserted into a close tolerance acceptance opening in the first panel element 12, the cam surfaces 50 will engage the edges of the acceptance opening and will be urged radially inwardly as the insertion proceeds. Once the external snap arms 48 have passed completely though the acceptance opening, they spring back into place such that the first panel element is then held between the shoulder 44 and the free edges 52 of the external snap arms 48 (FIG. 1).

As best seen through joint reference to FIGS. 3 and 4, in the exemplary construction the striker housing 22 also includes a pair of internal snap arms 60 which act to hold the striker 20 in place by snapping behind the enhanced diameter platform 34. In the illustrated exemplary arrangement, the internal snap arms 60 are preferably disposed at approximately 180 degrees relative to one another and at about 90 degrees relative to the external snap arms 48. As shown, the internal snap arms 60 extend in angled relation inwardly from the rear edge of the barrel segment 40. The free ends of the internal snap arms 60 thus project towards a guide ring 62 which extends away from an inner surface of the collar 42. The guide ring may be of segmented or continuous construction. As best seen in FIGS. 4 and 6, the axial passageway defined by the guide ring has an effective diameter which is large enough to pass the distal ball head 30 and intermediate step 36 while blocking passage of the enhanced diameter platform 34.

As best seen through joint reference to FIGS. 3 and 4, in the exemplary arrangement a subassembly made up of the preformed striker 20 and housing 22 may be assembled by insertion of the striker 20 in the direction shown by the arrow in FIG. 3. During the assembly process, the distal ball head 30 and shaft 28 pass through the axial passageway defined by the guide ring 62 such that the distal ball head 30 and a portion of the shaft 28 project outwardly past the collar 42. As the striker 20 is inserted into the housing 22, the enhanced diameter platform 34 engages the internal snap arms 60 thereby causing the internal snap arms 60 to flex in a radially outward direction away from the path of insertion. Once the enhanced diameter platform 34 has been advanced past the internal snap arms 60, the outward biasing force is eliminated and the internal snap arms 60 then spring back into position behind the rear surface of the enhanced diameter platform 34 (FIG. 4). In this position the enhanced diameter platform 34 is locked in place between the internal snap arms 60 and the guide ring 62. The proximal hub 38 provides a lateral contact surface for the internal snap arms 60 to promote proper placement of the internal snap arms 60 against the underside of the enhanced diameter platform 34. The proximal hub 38 also aids in centering the striker 20. As will be appreciated, in the assembled condition illustrated in FIG. 4, the striker 20 is substantially blocked against axial movement. However, the striker 20 may shift laterally to some degree due to the spacing between the outer surface of the intermediate step 36 and the inner surface of the guide ring 62. As will be described further hereinafter, capacity for such lateral movement may be beneficial in promoting alignment between the striker 20 and the striker catch 24 during use.

It is contemplated that the subassembly illustrated in FIG. 4 made up of the preformed striker 20 and housing 22 may be put together prior to being shipped to a location for insertion into the acceptance opening in the first panel element 12. However, the striker 20 and housing 22 may also be shipped at separate pieces and assembled on site if desired.

As indicated previously, the snap assembly 10 also includes a striker catch 24 which is adapted for press-fit retention within an acceptance opening in a second panel element 14 (FIG. 1). As best seen through joint reference to FIGS. 1 and 5, in the exemplary illustrated construction, the catch 24 includes a generally annular barrel segment 70 extending away from one side of an enhanced diameter collar 72 to define a shoulder 74 at the intersection between the barrel segment 70 and the enhanced diameter collar 72. As seen in FIG. 1, the barrel segment 70 and the enhanced diameter collar 72 are sized to permit press-fit insertion of the barrel segment 70 through the acceptance opening (not shown) in the second panel element 14 while blocking passage of the enhanced diameter collar 72.

Referring to FIG. 5, the barrel segment 70 of the striker catch 24 includes a pair of flexible external snap arms 78 that snap behind the second panel element 14 to hold the catch 24 in place. Specifically, the external snap arms 78 are outwardly angled flap structures formed integrally within the wall of the annular barrel segment 70. In the illustrated construction, the external snap arms 78 include radially raised cam surfaces 80 extending to a position slightly outboard from the perimeter of the barrel segment 70. A free edge 82 is disposed below the cam surfaces 80. As shown, the shoulder 74 may include molded-in depressions in opposing relation to the free edges 82 to aid in facilitating pivoting action by the external snap arms 78 when a compressing force is applied.

As will be appreciated, when the barrel segment 70 is inserted into a close tolerance acceptance opening in the second panel element 14, the cam surfaces 80 will engage the edges of the acceptance opening and will be urged radially inwardly as the insertion proceeds. Once the external snap arms have passed completely though the acceptance opening, they spring back into place such that the second panel element 14 is secured between the shoulder 74 and the free edges 82 of the external snap arms 78 (FIG. 1).

Referring now to FIGS. 5 and 6, it may be seen that the striker catch 24 includes an arrangement of circumferentially disposed inwardly angled retaining arms 90. In the illustrated exemplary construction the retaining arms 90 cooperatively define a hub and spoke opening for insertion of the distal ball head 30. In the illustrated exemplary arrangement four retaining arms 90 are arranged to form segments of generally dome-shaped structure defining a central opening 92 with slots 94 extending radially away from the central opening 92. As shown, the apex of the dome structure may be substantially flat although it may also be curved if desired. The distal edges of the retaining arms 90 may be curved circumferentially and/or angled axially to substantially mate with the circumferential curvature and axial angle of the chamfered surface on 32 of the distal ball head 30 if desired. However, flat edge surfaces also may be used. As will be appreciated, a structure as illustrated may be formed as one piece from a resilient polymeric material using injection molding or other suitable practices as will be known to those of skill in the art.

As best illustrated through joint reference to FIGS. 1 and 6, during use the striker 20 which is mounted within the housing 22 may be matedly inserted axially into the catch 24 such that the distal ball head 30 passes through the central opening 92 and is then held in place by the retaining arms 90. As will be appreciated, while only a single striker 20 and complementary catch 24 are shown, in actual practice a number of such complementary pairs are typically used to secure panel elements in close juxtaposed relation. Thus, proper engagement may require alignment of numerous strikers with complementary catches. As noted previously, since the striker 20 has the capacity for a degree of lateral movement within the housing 22, minor misalignments between one or more of the striker and catch elements can be compensated for without the need for reconfiguring the work piece.

In practice the retaining arms 90 operate in a manner similar to the internal snap arms 60 in the striker housing. Specifically, the retaining arms 90 flex outwardly as the ball head 30 passes through the central opening 92. Following insertion, the distal ends of the retaining arms rest against the chamfered surface 32. In this orientation, the striker 20 is blocked against both lateral and longitudinal movement thereby providing a secure connection. However, the striker 20 and the catch 24 may be separated if desired by applying a sufficient pulling force. By way of example only, and not limitation, it is contemplated that in some embodiments the insertion force for introducing the striker into the catch may be about 10 pounds force with the extraction force to overcome the locking engagement being about 12 pounds force. Of course, these levels may be adjusted as desired.

FIG. 7 illustrates an alternative exemplary subassembly wherein elements previously described are designated by like reference numerals increased by 100. In this construction the preformed striker 120 has a configuration as previously illustrated and described and is held within housing 122 as described previously and illustrated in FIGS. 4 and 6. In the illustrated assembled condition, a shaft 128 of the striker 120 projects outwardly away from the enhanced diameter collar 142. A ball head 130 is at the distal end of the shaft 128 with an outwardly flared chamfered surface 132 at the interface between the shaft 128 and the ball head 130.

In the exemplary subassembly shown in FIG. 7, the housing 122 is provided with an arrangement of circumferential stacked surface ring segments 145 molded integrally around the barrel segment 140. The surface ring segments 145 may be independent from one another or may be interconnected in a helical screw pattern. As shown, the surface ring segments are tapered slightly in the longitudinal direction of insertion to define a series of enhanced diameter circumferential ledges along the length of the barrel segment 140. As will be appreciated, when the barrel segment 140 is press-fit into a close tolerance acceptance opening in a first panel element, the surface ring segments 145 will engage the edges of the acceptance opening and the barrel segment 140 will be compressed radially inwardly to permit passage. In this regard, one or more longitudinal slots may be provided in the walls of the barrel segment 140 to facilitate compression. Once the barrel segment 140 has been inserted, withdrawal is blocked by the ring segment ledges. Such an arrangement may be particularly beneficial for use in conjunction with wood or plastic panel structures. In the event that the surface ring segments 145 are interconnected in a helical screw pattern, the housing may be screwed into place.

FIGS. 8 and 9 illustrate an alternative embodiment for a striker catch 124 wherein elements described previously are designated by corresponding reference numerals increased by 100. As shown, in this alternative embodiment the barrel segment 170 includes a pattern of integral surface ring segments 175. The surface ring segments 175 on the barrel segment of the catch may be independent from one another or may be interconnected in a helical screw pattern. As shown, the stacked ring segments 175 are tapered slightly in the longitudinal direction of insertion to define a series of enhanced diameter circumferential ledges along the length of the barrel segment 170. As will be appreciated, when the barrel segment is press-fit into a close tolerance acceptance opening in a panel element, the stacked ring segments 175 will engage the edges of the acceptance opening and the barrel segment 170 will be compressed radially inwardly to permit passage. In this regard, longitudinal slots may be provided in the walls of the barrel segment to facilitate compression. Withdrawal is then blocked by the ring segment ledges. Such an arrangement may be particularly beneficial for use in conjunction with wood or plastic panel structures. In the event that the ring segments 175 are interconnected in a helical screw pattern, the housing may be screwed into place.

As will be appreciated, a striker housing 122 and a striker catch 124 incorporating stacked ring segments may be used in conjunction with one another. However, they also may be used in combination with complementary components incorporating alternative locking mechanisms if desired including locking arms as described in relation to FIGS. 1-6.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

The invention claimed is:

1. A snap assembly adapted to adjoin a first element in juxtaposed opposing relation to a second element, the snap assembly comprising:
    a striker of elongated configuration including a base platform and an elongated pin segment projecting away from one side of the base platform, the elongated pin segment including a striker shaft and a distal ball head;
    a housing holding the striker, the housing having a perimeter wall structure including a plurality of external snap arms or a plurality of surface ring segments defining a plurality of circumferential ledges along the length of the housing adapted to hold the housing in inserted relation within an opening in the first element, the housing further including a plurality of internal snap arms normally extending in inwardly angled relation from the wall structure towards a reduced diameter axial passageway at the interior of the housing, wherein the reduced diameter axial passageway has an effective diameter which is greater than the distal ball head and less than the base platform, wherein the elongated pin segment extends along the reduced diameter axial passageway such that the distal ball head and at least a portion of the striker shaft project outwardly away from the housing with the base platform of the striker disposed between the reduced diameter axial passageway and distal ends of the internal snap arms; and
    a striker catch adapted to lockingly engage the distal ball head upon insertion into the striker catch.

2. The snap assembly as recited in claim 1, wherein the striker is a one-piece molded structure.

3. The snap assembly as recited in claim 1 wherein the housing is a one-piece molded structure.

4. The snap assembly as recited in claim 1 wherein the striker catch is a one-piece molded structure.

5. The snap assembly as recited in claim 1, wherein each of the striker, the housing and the striker catch are one-piece molded structures.

6. The snap assembly as recited in claim 1, wherein the pin segment includes an intermediate step disposed between the striker shaft and the base platform, the intermediate step having an effective diameter greater than the striker shaft and less than the reduced diameter axial passageway such that the intermediate step is received within the reduced diameter axial passageway.

7. The snap assembly as recited in claim 1, wherein the pin segment includes a flared chamfered surface extending between the striker shaft and the distal ball head.

8. The snap assembly as recited in claim 1, wherein the striker includes a proximal hub projecting from the side of the base platform facing away from the pin segment and wherein the proximal hub is substantially aligned along a common axis with the pin segment.

9. The snap assembly as recited in claim 1, wherein the external snap arms include free edges disposed in opposing raised relation to a housing collar of enhanced diameter relative to the housing perimeter wall the external snap arms and the housing collar being adapted to cooperatively clamp a portion of the first element.

10. The snap assembly as recited in claim 1, wherein the striker catch includes a catch barrel segment of annular configuration extending away from a catch collar of enhanced diameter relative to the catch barrel segment, the catch housing barrel segment having a perimeter wall structure including a plurality of external catch snap arms or a plurality of stacked circumferential ring segments, wherein the external catch snap arms include free edges disposed in opposing raised relation to the catch collar.

11. The snap assembly as recited in claim 10, wherein the striker catch further includes a plurality of flexible interior retaining arms extending in angled relation away from the plane defined by the catch collar, the distal ends of the retaining arms forming the perimeter of an acceptance opening adapted to receive the distal ball head, wherein the acceptance opening has a normal diameter less than the distal ball head such that the retaining arms flex outwardly upon insertion of the distal ball head into the acceptance opening and the distal ends of the retaining arms are held behind the distal ball head.

12. The snap assembly as recited in claim 11, wherein the pin segment includes a flared chamfered surface extending between the striker shaft and the distal ball head and the distal ends of the retaining arms define an angled face with concave curvature substantially conforming to the chamfered surface.

13. The snap assembly as recited in claim 12, wherein the retaining arms cooperatively form a dome shape.

14. A snap assembly adapted to adjoin a first element in juxtaposed opposing relation to a second element, the snap assembly comprising:
- a striker of elongated configuration including a base platform and an elongated pin segment projecting away from one side of the base platform, the elongated pin segment including a striker shaft disposed between the base platform and a distal ball head, with an outwardly flared chamfered surface at the intersection between the striker shaft and the distal ball head;
- a housing adapted to receive and hold the striker, the housing including a housing barrel segment of annular configuration extending away from a housing collar of enhanced diameter relative to the housing barrel segment, the housing barrel segment having a perimeter wall structure including a plurality of external snap arms or a plurality of surface ring segments defining a plurality of circumferential ledges along the length of the housing adapted to hold the housing in inserted relation within an opening in the first element, the housing barrel segment further including a plurality of internal snap arms disposed at the interior of the housing barrel segment, the internal snap arms normally extending in inwardly angled relation from the wall structure towards a ring structure defining a reduced diameter axial passageway at the interior of the housing with the distal ends of the internal snap arms being spaced axially from the ring structure, wherein the reduced diameter axial passageway has an effective diameter which is greater than the distal ball head and less than the base platform, the internal snap arms being oriented such that the base platform urges the internal snap arms radially outwardly during insertion of the striker into the housing barrel segment during insertion along an axial travel path such that the internal snap arms snap behind the base platform upon insertion of the striker to hold the base platform between the internal snap arms and the ring structure with the distal ball head and at least a portion of the striker shaft projecting outwardly away from the plane defined by the housing collar; and
- a striker catch adapted to lockingly engage the distal ball head upon insertion into the striker catch.

15. The snap assembly as recited in claim 1, wherein the pin segment includes an intermediate step disposed between the striker shaft and the base platform, the intermediate step having an effective diameter greater than the striker shaft and less than the reduced diameter axial passageway such that the intermediate step is received within the reduced diameter axial passageway.

16. The snap assembly as recited in claim 15, wherein the striker includes a proximal hub projecting from the side of the base platform facing away from the pin segment and wherein the proximal hub is substantially aligned along a common axis with the pin segment.

17. The snap assembly as recited in claim 16, wherein the external snap arms include free edges disposed in opposing raised relation to the housing collar, the external snap arms and the housing collar being adapted to cooperatively clamp a portion of the first element.

18. The snap assembly as recited in claim 14, wherein the striker catch includes a catch barrel segment of annular configuration extending away from a catch collar of enhanced diameter relative to the catch barrel segment, the catch housing barrel segment having a perimeter wall structure including a plurality of external catch snap arms, wherein the external catch snap arms include free edges disposed in opposing raised relation to the catch collar.

19. The snap assembly as recited in claim 18, wherein the striker catch further includes a plurality of flexible interior retaining arms extending in angled relation away from the plane defined by the catch collar, the distal ends of the retaining arms forming the perimeter of an acceptance opening adapted to receive the distal ball head, wherein the acceptance opening has a normal diameter less than the distal ball head such that the retaining arms flex outwardly upon insertion of the distal ball head into the acceptance opening and the distal ends of the retaining arms are held behind the distal ball head at the chamfered surface and wherein the distal ends of the retaining arms define an angled face with concave curvature substantially conforming to the chamfered surface.

20. A snap assembly adapted to adjoin a first element in juxtaposed opposing relation to a second element, the snap assembly comprising:
- a one-piece molded striker of elongated configuration including a base platform and an elongated pin segment projecting away from one side of the base platform, the elongated pin segment including a striker shaft extending between the base platform and a distal ball head with an outwardly flared chamfered surface at the intersection between the striker shaft and the distal ball head, wherein the distal ball head has an effective diameter which is less than the effective diameter of the base platform and greater than the effective diameter of the shaft, the striker further including a proximal hub projecting from the side of the base platform facing away from the pin segment and wherein the proximal hub is substantially aligned along a common axis with the pin segment;
- a housing of one-piece molded construction adapted to receive and hold the striker, the housing including a housing barrel segment of annular configuration extending away from a housing collar of enhanced diameter relative to the housing barrel segment, the housing barrel segment having a perimeter wall structure including a plurality of external snap arms, wherein the external snap arms include free edges disposed in opposing raised relation to the housing collar, the external snap arms and the housing collar being adapted to cooperatively clamp a portion of the first element and to hold the housing in snap-fit relation within an opening in the first element, the housing barrel segment further including a plurality of internal snap arms disposed at the interior of the housing barrel segment, the internal snap arms normally extending in inwardly angled relation from the perimeter wall structure towards a ring structure defining a reduced diameter axial passageway at the interior of housing with the distal ends of the internal snap arms being spaced axially from the ring structure, wherein the reduced diameter axial passageway has an effective diameter which is greater than the distal ball head and less than the base platform, the internal snap arms being oriented such that the base platform urges the internal snap arms radially outwardly during insertion of the striker into the housing barrel segment along an axial travel path such that the internal snap arms snap behind the base platform upon insertion of the striker to hold the base platform between the internal snap arms and the ring structure with the distal ball head and at least a portion of the striker shaft projecting outwardly away from the plane defined by the housing collar; and a striker catch of one-piece molded construction adapted to lockingly engage the distal ball head upon insertion into the striker catch, the striker catch including a catch barrel segment of annular configuration extending away from a catch collar of enhanced diameter relative to the catch barrel segment, the catch housing barrel segment having a perimeter wall structure including a plurality of external snap arms adapted to hold the striker catch in snap-fit relation within an opening in the second element, the striker catch further including a plurality of flexible interior retaining arms extending in angled relation away from the plane defined by the catch collar, the distal ends of the retaining arms forming the perimeter of an acceptance opening adapted to receive the distal ball head, wherein the acceptance opening has a normal diameter less than the distal ball head such that the retaining arms flex outwardly upon insertion of the distal ball head into the acceptance opening and the distal ends of the retaining arms are held against the chamfered surface.

* * * * *